F. DANZENBAKER.
Adjustable-Gate.
No. 214,112.  Patented April 8, 1879.
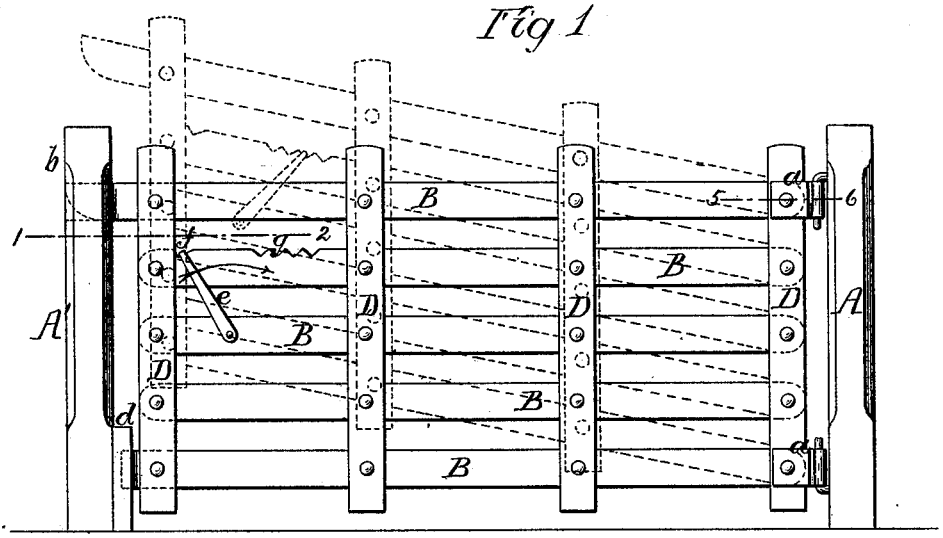
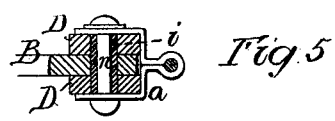
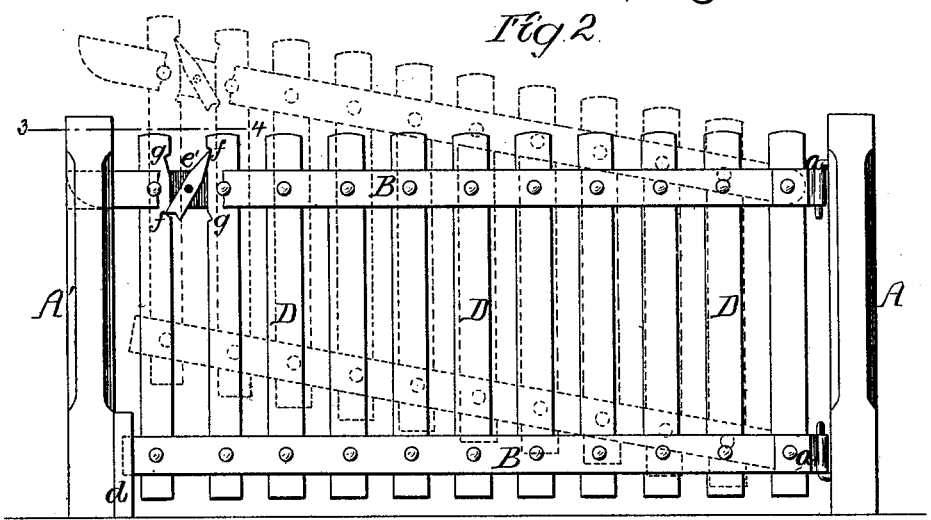
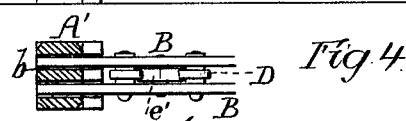
Witnesses
J. M. Degney
Harry Smith
Inventor
Francis Danzenbaker
by his Attorneys
Howson and Son

UNITED STATES PATENT OFFICE.

FRANCIS DANZENBAKER, OF BRIDGETON, NEW JERSEY.

IMPROVEMENT IN ADJUSTABLE GATES.

Specification forming part of Letters Patent No. 214,112, dated April 8, 1879; application filed January 9, 1879.

*To all whom it may concern:*

Be it known that I, FRANCIS DANZENBAKER, of Bridgeton, New Jersey, have invented a new and useful Improvement in Adjustable Gates, of which the following is a specification.

My invention relates to a certain improvement in that class of gates known as "adjustable gates," in which the horizontal bars and vertical rails are pivoted together, so that the front end of the gate may be elevated.

The objects of my improvement are to insure the easy operation of the gate, and to provide a simple, cheap, and readily-manipulated device which can be used either to lock the gate in its closed position or to retain the gate when elevated. These objects I attain in the manner which I will now proceed to describe, reference being had to the accompanying drawings, in which—

Figures 1 and 2 are side views of different forms of gate, showing the application of my improved fastening device thereto; Fig. 3, a sectional plan on the line 1 2, Fig. 1; Fig. 4, a sectional plan on the line 3 4, Fig. 2; and Fig. 5, a sectional plan on the line 5 6, Fig. 1, drawn to an enlarged scale.

In Figs. 1 and 2, A A' are the opposite gate-posts; B, the horizontal bars, and D the vertical rails, of the gate.

The gate is hung to the post A by hinges *a*, and the top bar B of the gate, when the latter is down, fits into a recess, *b*, in the top of the post A', the bar projecting beyond the end rail D, for this purpose, and thus preventing the gate from being swung on its hinges until its outer end is first raised sufficiently to free the projecting end of the rail B from the slot in the post.

For the same purpose the bottom bar B is projected into a slot in a projection, *d*, formed on or secured to the post A' at and near the base of the same.

To one of the bars B of the gate shown in Fig. 1 is hung a yoke, *e*, which embraces the bar above that to which it is hung. When the gate is down and the yoke adjusted to the position shown by full lines, the loop of the yoke rests in a notch, *f*, close to the end rail D, and thus prevents any elevation of the front end of the gate.

When it is desired to elevate the said front end of the gate the yoke *e* is thrown over in the direction of the arrow, and when the gate has been raised to the desired height the loop of the yoke catches in one of a number of notches, *g*, and thus holds the end of the gate in its elevated position.

In Figs. 2, a pawl, *e'*, is substituted for the yoke *e*, and this pawl is hung to the top bar B of the gate, and engages with notches *f* and *g* formed in the two rails D nearest the front end of the gate, the pawl being adjusted to the position shown by full lines in order to lock the gate in its closed position, and being adjusted to the position shown by dotted lines in order to support the gate in its elevated position. In this case both ends of the pawl engage with the notches, so that the pivot-pin of the pawl is relieved from all strain.

The upper portion of the pawl should be slightly heavier than that portion below the pivot-pin, so that the pawl will be self-retaining in either of the inclined positions to which it may be adjusted.

By combining the pivoted pawl or yoke with rails or bars having notches on opposite sides of the pivot of said pawl or yoke, the simple throwing of the latter over from one side to the other is all that is necessary in order to effect the locking or supporting of the gate.

The device, moreover, is simple and inexpensive, and can be readily applied to an ordinary adjustable gate, and the gate itself may be made without the usual unsightly triangular braces.

In order to prevent the binding together of the bars and rails of the gate to such an extent as to prevent the free working of the same, especially at those points where the hinges are applied, I use sleeves *i*, which surround the bolts *n* by which the hinges are secured, and are of sufficient length to extend entirely through the bar and rails and bear against the opposite side plates of the hinge, as shown in Fig. 5.

By this means the bolt is prevented from binding the bars and rails too closely together; and, furthermore, a larger surface is presented to resist the end-thrust of the bar, and the cutting of the latter by the bolt is thereby prevented.

The sleeve may be applied to other joints than those shown, if desired.

I claim as my invention—

As an improved locking and supporting device for adjustable gates, the within-described yoke or pawl, pivoted in respect to notches $f$ and $g$ formed in a bar or rail of the gate, as set forth, so that said yoke or pawl will by its own weight, when thrown past the central line, rest in either of the notches $f$ or $g$, and thus serve the double purpose as herein specified.

In testimony whereof I have signed my name to this specification in the presence of two subscribing witnesses.

FRANCIS DANZENBAKER.

Witnesses:
WM. JOHN COOPER,
HARRY SMITH.